United States Patent
Boehm et al.

(10) Patent No.: US 10,906,452 B2
(45) Date of Patent: Feb. 2, 2021

(54) CONTROL DEVICE FOR A HEADLIGHT AND METHOD FOR OPERATING A HEADLIGHT

(71) Applicant: DAIMLER AG, Stuttgart (DE)

(72) Inventors: Jan Boehm, Grafenau (DE); Marcus Fiege, Stuttgart (DE); Joerg Moisel, Neu-Ulm (DE); Axel Mueller, Schorndorf (DE); Volker Reinhold, Herrenberg (DE); Katharina Wagner, Böblingen (DE)

(73) Assignee: DAIMLER AG, Stuttgart (DE)

( * ) Notice: Subject to any disclaimer, the term of this patent is extended or adjusted under 35 U.S.C. 154(b) by 59 days.

(21) Appl. No.: 16/321,274

(22) PCT Filed: Jul. 25, 2017

(86) PCT No.: PCT/EP2017/000896
§ 371 (c)(1),
(2) Date: Jan. 28, 2019

(87) PCT Pub. No.: WO2018/019413
PCT Pub. Date: Feb. 1, 2018

(65) Prior Publication Data
US 2020/0148094 A1 May 14, 2020

(30) Foreign Application Priority Data
Jul. 29, 2016 (DE) .................. 10 2016 005 458

(51) Int. Cl.
*B60Q 1/08* (2006.01)
*H05B 47/125* (2020.01)
(Continued)

(52) U.S. Cl.
CPC .............. *B60Q 1/085* (2013.01); *B60R 11/04* (2013.01); *H05B 47/125* (2020.01); *B60Q 2300/41* (2013.01); *G01S 13/931* (2013.01)

(58) Field of Classification Search
CPC ................ B60Q 1/085; B60Q 2300/41; B60Q 2300/054; B60Q 2300/312; B60R 11/04; H05B 47/125
See application file for complete search history.

(56) References Cited

U.S. PATENT DOCUMENTS 6,049,171 A * 4/2000 Stam ...................... B60Q 1/085
315/82
6,275,145 B1 * 8/2001 Rogozinski .......... B60Q 1/0023
340/425.5
(Continued)

FOREIGN PATENT DOCUMENTS

DE          10303046 A1      10/2004
DE       102010048100 A1      4/2012
(Continued)

OTHER PUBLICATIONS

De Charette et al., "Fast Reactive Control for Illumination Through Rain and Snow," 2012 IEEE International Conference on Computational Photography (ICCP), Apr. 28-29, 2012, Seattle, WA.
(Continued)

*Primary Examiner* — Borna Alaeddini
(74) *Attorney, Agent, or Firm* — Patent Portfolio Builders PLLC (57) ABSTRACT

A control device for a headlight for emitting light according to a headlight signal corresponding to an adjustable light distribution. The control device outputs the headlight signal, corresponding to the adjustable light distribution, to the headlight. The control device has an evaluation unit that determines object position data of the object when particles are detected using a detection unit and a self-illuminating (Continued)

object is detected, and to determine, as a function of the object position data, a region in which the object is located. The evaluation unit also generates data for the light distribution as a function of the region in such a way that a light intensity in the region is reduced or increased with respect to a light intensity outside this region, and correspondingly to determine and output the headlight signal from the data for the light distribution.

14 Claims, 3 Drawing Sheets

(51) Int. Cl.
*B60R 11/04* (2006.01)
*G01S 13/931* (2020.01)

(56) References Cited

U.S. PATENT DOCUMENTS

| | | | |
|---|---|---|---|
| 9,336,449 B2 | 5/2016 | Nakanishi | |
| 2007/0253597 A1* | 11/2007 | Utida | G06K 9/3241 382/104 |
| 2009/0067184 A1* | 3/2009 | Kamioka | G06K 9/00825 362/464 |
| 2009/0072124 A1* | 3/2009 | Schofield | B60Q 1/143 250/208.1 |
| 2013/0058116 A1 | 3/2013 | Galbas et al. | |
| 2014/0355827 A1* | 12/2014 | Ogawa | B60Q 1/143 382/103 |
| 2017/0253172 A1* | 9/2017 | Canonne | H05B 47/105 |
| 2018/0319642 A1* | 11/2018 | Pronger | F16P 3/14 |

FOREIGN PATENT DOCUMENTS

| | | |
|---|---|---|
| DE | 202012001196 U1 | 4/2012 |
| DE | 102012103293 A1 | 10/2013 |
| DE | 102013104276 A1 | 10/2014 |
| DE | 102014107195 A1 | 11/2015 |
| DE | 102015207443 A1 | 11/2015 |
| DE | 102014009254 A1 | 12/2015 |
| EP | 1780462 A1 | 5/2007 |
| EP | 2562039 A2 | 2/2013 |
| EP | 2982540 A1 | 2/2016 |

OTHER PUBLICATIONS

International Search Report dated Nov. 27, 2017 in related/corresponding International Application No. PCT/EP2017/000896.
Search Report created on Mar. 6, 2017 in related/corresponding DE Application No. 10 2016 005 458.1.
Written Opinion dated Nov. 27, 2017 in related/corresponding International Application No. PCT/EP2017/000896.

* cited by examiner

CONTROL DEVICE FOR A HEADLIGHT AND METHOD FOR OPERATING A HEADLIGHT

BACKGROUND AND SUMMARY OF THE INVENTION

Exemplary embodiments of the present invention relate to a control device for a headlight, in particular a vehicle headlight, for emitting light in accordance with a headlight signal that corresponds to an adjustable light distribution, the control device being designed to output the headlight signal corresponding to the adjustable light distribution to the headlight terminal. Exemplary embodiments of the invention further relate to a control device for a headlight, in particular a vehicle headlight, having an adjustable light distribution, at least one controller and at least one object detection unit. Exemplary embodiments of invention further relate to a headlight for a motor vehicle and to a motor vehicle. Finally, the exemplary embodiments of the invention also relate to a method for operating a headlight, in particular a vehicle headlight, which emits light in accordance with a headlight signal that corresponds to an adjustable light distribution, and particles and a self-illuminating object are detected by means of a detection unit.

Control devices for headlights, in particular pixel headlights, as well as methods for the operation thereof, headlights and also motor vehicles comprising headlights of this kind are known extensively in the prior art. They are used to illuminate predefined terrain in a predefined manner, for which purpose a predefined, in particular adjustable, light distribution is provided. In motor vehicles they are used for illuminating a road and also for providing self-illumination of the motor vehicle in accordance with regulations. According to the predefined or adjustable light distribution, the headlight obtains a headlight signal by means of which the headlight is controlled in accordance with the light distribution such that an illumination backdrop is adjusted according to the light distribution. Particularly in the case of pixel headlights provided for operation in motor vehicles, it has been shown to be advantageous when the light distribution can be adjusted or adapted in a simple manner as required. For instance, it is possible to implement a low beam or high beam function as the light distribution merely by controlling the pixel headlight by means of a corresponding headlight signal. Of course, the use of a pixel headlight is not limited to the use in front headlights of motor vehicles but may also be in rear headlights and/or the like.

A method for controlling a light distribution of a headlight of a motor vehicle is known for example from DE 10 2014 009 254 A1, which addresses the question of adjusting the light distribution in such a way that meeting a dazzling criterion in a predefined region is prevented. The aim is thus to avoid dazzling drivers of other motor vehicles and causing potentially dangerous situations as a result.

A method is also known from DE 103 03 046 A1 as well as an apparatus by means of which a quantitative estimation of visibility in a motor vehicle for use in the case of fog is to be attained. The visibility determined therein can be provided for further vehicular functions and can preferably be transmitted to the driver as information.

When there is fog, it has been shown to be detrimental, particularly when motor vehicles are being operated as normal, that visibility may be considerably reduced because of the fog. Particularly in the case of nighttime journeys, operating motor vehicle front headlights as normal has proven to be detrimental in that a background brightness is produced by the fog in the field of vision of the driver, which brightness makes it difficult for the driver to perceive external light sources, for example rear lights of motor vehicles driving in front, self-illuminating traffic signs such as traffic lights and the like. Nevertheless, illumination has to comply with regulations in an operating state of this kind. However, even when the speed of the motor vehicle is reduced accordingly, the aforementioned light sources may only be perceived very late in some cases. This is detrimental if the driver of the motor vehicle has to perform an action in a current driving state of the motor vehicle because of the detected light source. Fundamentally, it is also comparably disadvantageous when operating illumination systems that are operated in an open area or outdoor area, for example in order to illuminate a secured area for the purpose of surveillance or the like.

The problem addressed by the invention is therefore that of improving the perceptibility of self-illuminating objects in fog, in particular also in darkness.

In terms of the control device, it is particularly alternatively proposed for a generic control device to have an evaluation unit which, when particles are detected by means of a detection unit and a self-illuminating object is detected, is designed to determine object position data of the object and, on the basis of the object position data, to determine a region in which the object is located, the evaluation unit being further designed to generate data for the light distribution based on the region in such a way that a light intensity in the region is reduced or increased with respect to a light intensity outside the region and, from the data for the light distribution, to determine and output the headlight signal accordingly.

It is also particularly proposed for a generic control device, that the control device is designed to adjust the light distribution by means of a feedback control system, in which a detected object is illuminated by a locally variable illumination intensity and the feedback control system uses, as the controlled variable, a contrast between an actively illuminated zone of the detected object and a passively illuminated zone of the detected object.

For example, the control device may have an evaluation unit having a first sensor terminal for a particle sensor for detecting particles and a second sensor terminal for an object sensor for detecting a self-illuminating object, the evaluation unit being designed, when particles are detected by means of the particle sensor and a self-illuminating object is detected by means of the object sensor, to determine object position data of the object and, on the basis of the object position data, to determine a region in which the object is located, the evaluation unit being further designed to generate data for the light distribution on the basis of the region in such a way that a light intensity in the region is reduced or increased with respect to a light intensity outside the region and, from the data for the light distribution, to determine and output the headlight signal accordingly. However, the detection sensor does not have to be formed in two parts but can instead comprise a single sensor that allows particles and objects to be detected. A sensor of this kind may be formed by a camera or the like. In this case, of course, the evaluation unit preferably requires only one terminal for the detection sensor.

For a generic headlight, it is proposed that the headlight has a control device according to the invention and the headlight has a pixel-based light source.

For a generic motor vehicle, it is proposed that the vehicle has a headlight according to the invention and the detection unit for detecting particles and for detecting a self-illuminating object.

In terms of the method, it is proposed, in relation to a generic method, that, when particles are detected by means of the detection sensor and a self-illuminating object is detected, object position data of the object and, on the basis of the object position data, a region in which the object is located, are determined, data for the light distribution being generated on the basis of the region in such a way that a light intensity in the region is reduced or increased with respect to a light intensity outside the region and, from the data for the light distribution, the headlight signal is determined.

The invention is based on the rationale that when there are particles, for example on account of fog, smoke, snowfall or the like, in particular in combination with darkness, a self-illuminating object can be better perceived when its own illumination is reduced, and specifically in particular in a region of vision that comprises a region around the object. It is known that particles, in particular fog but also dust, snowflakes or the like, lead to light inherent in the often-fine particles being scattered and scattered light being produced, which leads to undesirable illumination of the space between the headlight and the object. Background brightness is thus produced having a contrast-reducing effect such that perceptibility of the self-illuminating object is reduced. Overall, the contrast between the self-illuminating object and its surroundings is reduced in such a way that, for example in a driving operation of the motor vehicle, the ability of the driver of the motor vehicle to perceive motor vehicles driving in front, traffic lights, self-illuminating traffic signs and/or the like is impeded. The invention uses this rationale to the effect that a region is determined which extends around the object and in which the object is located, and this region is illuminated to a reduced degree, as a result of which the effect of scattered light in this region is reduced. The contrast between the self-illuminating object and its surroundings is thus improved. Consequently, the perceptibility of the self-illuminating object is increased.

The self-illuminating object may for example be a light signal system such as a traffic light, a self-illuminating traffic sign, an automatic signal system but also headlights of other motor vehicles, in particular front headlights, rear lights, brake lights but also backup lights and/or the like. Furthermore, the self-illuminating object may for example also be a warning light in monitored premises, the visibility of which light is intended to be improved at a monitoring point.

A headlight is an illumination device, which is used to provide an illumination backdrop that corresponds to the predefined, in particular adjustable, light distribution. Preferably, the headlight is a pixel headlight that has a light source capable of emitting light in a matrix-like manner, for example a light source based on a matrix arrangement of light-emitting diodes. Furthermore, the headlight is, for example, a laser headlight, in particular based on a scanner principle. Due to its properties, the pixel headlight produces a plurality of light distributions by controlling, as appropriate, the light source thereof, for example low beam, high beam, parking light and/or the like in a front headlight for a motor vehicle.

The invention uses a detection sensor for detecting particles. Particles may be dust, ice particles, snowflakes, droplets, in particular fog and/or the like. In particular, the detection sensor may be designed as a particle sensor, as a fog sensor for detecting fog or the like. According to the detected particles, the detection sensor can provide a particle sensor signal that can be further processed by means of the evaluation unit. In particular, according to the detected fog, a fog signal can be provided in a fog sensor which signal can be further processed by means of the evaluation unit. However, it may also be the case that a particle sensor signal is provided in a particle sensor or a fog sensor signal provided in a fog sensor, which signal is initially evaluated by means of the evaluation unit in order to determine whether particles are present or fog is present. The detection sensor, in particular the particle sensor or the fog sensor, may for example be formed by a camera or the like.

Likewise, the invention uses an object signal of the detection sensor in order to detect the object. The detection sensor may for example comprise an object sensor, which may comprise a camera and/or a radar or radar system. If a camera is provided, the camera may also be used at the same time as the particle sensor. In this respect, when using a camera as the detection unit it can be possible to detect particles and objects. Preferably, the detection sensor, in particular the object sensor, is already designed to determine whether the object is a self-illuminating object. For this purpose, the detection sensor or the object sensor may comprise a camera system, for example, in particular combined with the radar system. Of course, the object sensor can also transmit the object sensor signal thereof directly to the evaluation unit, which then evaluates the object sensor signal in order to determine whether a self-illuminating object is present. Fundamentally, however, the object sensor may also be combined with a database indicating whether the object is self-illuminating. The database may also comprise a remote database that can be made available via a communication link, for example via a mobile network, the internet and/or the like.

In order to allow the headlight to be controlled in a desired manner, the control device preferably has a headlight terminal to which the control device provides the headlight signal corresponding to the predefined light distribution. The headlight connected to the control device may then adjust the light source thereof accordingly on the basis of the headlight signal in order to produce the predefined light distribution. However, the connection may also be carried out by means of a bus system, in a motor vehicle, for example a CAN bus or the like. Fundamentally, this also applies in the same way to the detection unit which can likewise be connected to the control device by means of the bus system. The number of required connections can thus be reduced.

The method according to the invention may preferably be carried out by means of an evaluation unit, which is comprised by the control device. For this purpose, the evaluation unit preferably has a first sensor terminal for the particle sensor and the second sensor terminal for the object sensor. Sensor signals of the detection sensor, in particular of the particle sensor and of the object sensor, are thus provided in the evaluation unit. Alternatively or additionally, a connection may also be provided by means of the bus system. In this case, the evaluation unit and the detection sensor are each connected to the bus system.

The evaluation unit is further designed, when particles are detected by means of the detection sensor or the particle sensor and a self-illuminating object is detected by means of the detection sensor or the object sensor, to determine object position data of the object. The object position data may be, for example, a geographic position, for example on the basis of three-dimensional spatial coordinates or the like. Preferably, the evaluation unit is designed to transmit object position data only when particles and a self-illuminating object have been detected. It is possible for object position data not to be determined if the object is not self-illuminating, for example.

The evaluation unit also determines, on the basis of the object position data, a region in which the object is located. The region can be, for example, a solid angle, a space comprising the object and/or the like. Preferably, the region is larger than the object such that the object is covered as completely as possible by the region. The region can have a specific, predefined distance from the object. The distance can be adjustable. With respect to the region, the evaluation unit determines corresponding region data that characterize the region. For example, the region data can be formed by an angle specification of the solid angle in conjunction with a direction specification that can be determined from the object position data.

The evaluation unit is further designed to generate data for the light distribution based on the region data. For this purpose, corresponding data processing can be provided, which is carried out by means of a hardware circuit and/or a computer unit that is controlled by means of an appropriate computer program. In this case, the evaluation unit generates the data for the light distribution in such a way that a light intensity in the region is reduced or increased with respect to a light intensity outside the region acting as a reference light intensity. The reference light intensity is preferably the light intensity that would be determined by means of the control device if no particles and/or no self-illuminating object were detected. For example, the light intensity in the region may be reduced. In this way, effects caused by scattered light can be reduced in order to improve the contrast for perceiving the self-illuminating object. Under certain circumstances, however, the contrast can also be improved by increasing the light intensity in the region.

From the data of the light distribution, the evaluation unit then determines the headlight signal accordingly, which is output, for example, at the headlight terminal or to the bus system. The headlight signal may be, for example, an analog signal but also may be a digital signal. Particularly advantageously, the headlight signal may be a coded digital signal that contains detailed data with regard to the adjustment of the light distribution by the headlight. In this respect, the headlight signal corresponds to the predefined light distribution.

Furthermore, it may be possible for the control device to be designed to adjust the light distribution by means of a feedback control system, in which a detected object is illuminated by a locally variable illumination intensity and the feedback control system uses, as the controlled variable, a contrast between an actively illuminated zone of the detected object and a passively illuminated zone of the detected object. The feedback control system can be carried out by an electronic circuit, which can comprise a computer unit such as a microprocessor or the like. Preferably, it is possible for the actively illuminated zone to establish the region, as a result of which passively illuminated zones can also be determined at the same time. By means of the camera, acting as the detection sensor, an image is detected optically and a contrast between the zones determined therefrom. The feedback control is carried out in such a way that the contrast is at a maximum. For this purpose, a locally variable light distribution is provided by means of the headlight and adapted continuously over the course of the feedback control until the contrast is at a maximum.

It has proven to be particularly advantageous for the region to be determined on the basis of a geometric shape. For example, a geometric shape such as a circle, an ellipse, a rectangle, a square or the like may be provided for providing the region, which shape, with respect to the geometrical properties and when appropriate dimensions are chosen, is able to surround the object as completely as possible. It is thus not necessary to determine complex geometries for regions. Simple shapes can be used and therefore complexity with respect to providing the region can be reduced.

According to one embodiment, it is proposed that rear lights of a motor vehicle driving in front are detected as the object. A driving operation of a motor vehicle can thus be carried out more safely when visibility is poor on account of particles such as fog or the like because, due to the improved visibility of the rear lights, a distance from the motor vehicle driving in front can be better estimated by the driver of the motor vehicle driving behind.

It is further proposed that a license plate of the motor vehicle driving in front is detected as the object. Improved safety can also be achieved thereby because the estimation of the distance to the motor vehicle driving in front can be further improved.

It has also been proven to be advantageous for visibility to be determined and the dimensions of the region to be selected on the basis of the visibility. This embodiment makes it possible for the region to be selected to be only as large as is required for normal functioning of the invention. For example, when there is little fog and moderately reduced visibility, a smaller region surrounding the object by only a small distance can be determined, whereas, when there is thick fog and low visibility, a larger region is provided, which takes into account the intensified effect of scattered light in thick fog. Thus, it can be achieved that in normal illumination operation conditions, the invention intervenes only as significantly as necessary. The illumination function intended to be achieved by means of the headlight can thus be hindered as little as possible.

According to a further embodiment, it is proposed that a light intensity corresponding to a light distribution without particles or fog is used as a reference light intensity. The reference light intensity may be, for example, a predefined value or a predefined record, which is set in the control device for normal operation of the headlight when no particles are present, in particular fog, in conjunction with a self-illuminating object. This value or record can be predefined at the factory, for example. However, it may also be the case that the control device obtains the value or the record for the reference light intensity from a superordinate control unit, in particular a superordinate motor vehicle control unit. This makes it possible to provide the reference light intensity according to individual motor vehicles. Furthermore, however, the reference light intensity may also be provided by the headlight itself. Specifically, the reference light intensity may be provided individually for the headlight. This makes it possible, even in the case of maintenance, for example by replacing the headlight, to ensure that the headlight always provides the required light emission in order to be able to reliably perform the intended illumination function. When the headlight is replaced, it may be specifically required for the value or the record for the reference light intensity to be adapted to properties of the light source of the new headlight, in particular when the control device is formed separately from the headlight and not replaced. Overall, as a result, the reference light intensity is provided in a simple and reliable manner.

Furthermore, it is proposed that the light intensity in the region is changed in a pulsing manner. Particularly advantageously, this embodiment is suitable in conjunction with the increase in the light intensity with respect to the reference light intensity. By changing the light intensity in a pulsing manner, not only can an increase in contrast be achieved, but the attention of the driver can be drawn precisely to the region. As a result, it can become easier overall for the driver of the motor vehicle to perceive the self-illuminating object.

A pulse shape and/or a pulse frequency of the pulsing change in light intensity can also be varied. For example, the pulse shape and/or the pulse frequency can be adjusted based on visibility. However, the pulse shape and/or the pulse frequency can also be adjusted based on a distance of the self-illuminating object from the pixel headlight or the motor vehicle. A pulse height and/or a pulse frequency can increase as the distance decreases. Furthermore, of course, a pulse shape and/or a pulse frequency can also be selected in such a way that the visibility is improved by using ergonomic effects on account of the physical properties of a human eye. For this purpose, pulse shapes such as a rectangle, triangle, sine, sawtooth and/or the like, for example, can be used or even combined with one another. Furthermore, the frequency can also be adapted accordingly such that visibility can be improved. The pulse frequency can for example vary in a range of from approximately 0.1 Hz to approximately 50 Hz. Particularly advantageously, the pulse frequency can be from approximately 0.1 to approximately 1.5 Hz.

It has proven to be particularly advantageous for the pulsing change in light intensity to comprise a burst pulse. The burst pulse can consist of a temporally spaced apart pulse train of a plurality of very short individual pulses, which are likewise narrowly temporally spaced apart, for example every 0.5 s or less. The temporal spacing of burst pulses of this kind can be selected as to be in the region of more than approximately 0.5 s, in particular form approximately 1 s to approximately 5 s; in particular, the temporal spacing can be dependent on a spatial distance. As a result, an improved effect or adjustment can be achieved with respect to the perceptibility of the self-illuminating object, in particular an indicating function.

Further advantages, features and details of the invention can be found in the following description of a preferred embodiment and with reference to the drawings. The features and combinations of features stated previously in the description as well as the features and combinations of features stated in the following description of the figures and/or disclosed solely in the figures can be used not only in the respective stated combinations, but can also be used in other combinations or alone, without departing from the scope of the invention.

DETAILED DESCRIPTION

Figure 1:
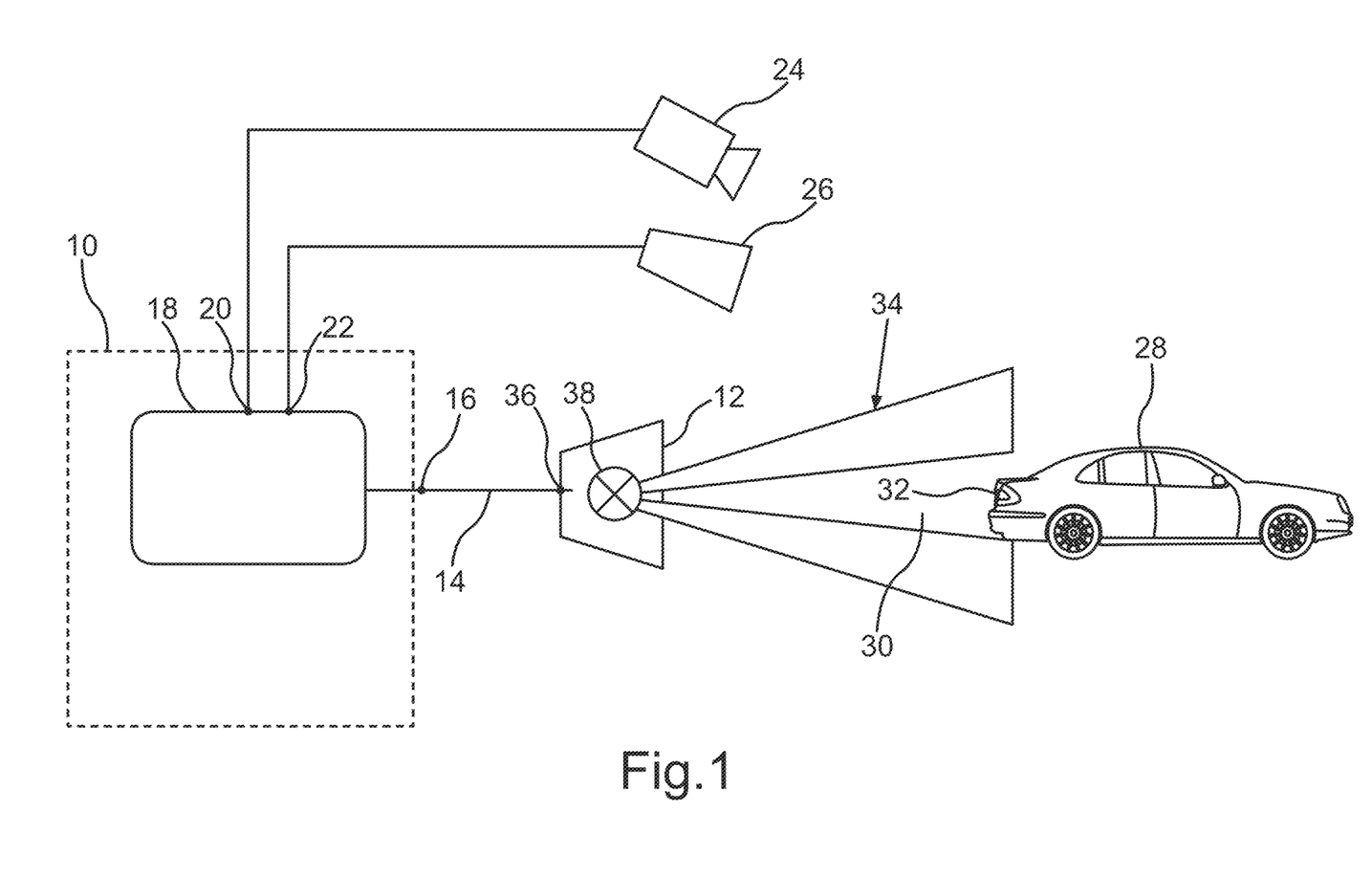
FIG. 1 schematically shows a control device according to the invention having a pixel headlight of a motor vehicle in normal operation.

FIG. 1 discloses, in a basic schematic diagram, a control device 10 according to the invention for a pixel headlight 12. The pixel headlight 12 in this case is a front headlight of a motor vehicle (not shown further), which headlight together with the control device 10 forms a headlight apparatus. The pixel headlight 12 emits light in accordance with a headlight signal 14 corresponding to a predefined light distribution 34. In this case, the control device 10 is designed to output the headlight signal 14 corresponding to the predefined light distribution 34 to the headlight terminal 16.

The pixel headlight 12, which in this case comprises a laser scanner acting as a pixel-based light source 38, is connected, by means of a terminal 36, to the headlight terminal 16 of the control device 10. According to the headlight signal 14, the laser scanner 38 produces a light distribution 34 for illuminating a road of the motor vehicle.

The control device 10 comprises an evaluation unit 18, which in this case is formed by an electronic circuit having a program-controlled microprocessor-type computer unit. The evaluation unit 18 has a first sensor terminal 20 for a fog sensor 24 acting as a particle sensor or as a detection sensor for detecting fog 40. The fog sensor 24 in this case is formed by a camera.

The evaluation unit 18 also has a second sensor terminal 22 for an object sensor 26 or as a detection sensor for detecting a self-illuminating object 32. The object sensor 26 in this case is formed by a radar. The radar also comprises an optical unit by means of which it can be detected whether the object 32 is self-illuminating. In this case the object 32 is a backup light of a motor vehicle 28 driving in front.

The evaluation unit 18 is designed, when fog 40 is detected by means of the fog sensor 24 and a self-illuminating object 32 is detected by means of the object sensor 26, to detect object position data of the object 32. For this purpose, the signal of the object sensor 26 is further evaluated in order to determine spatial position coordinates.

Figure 2:
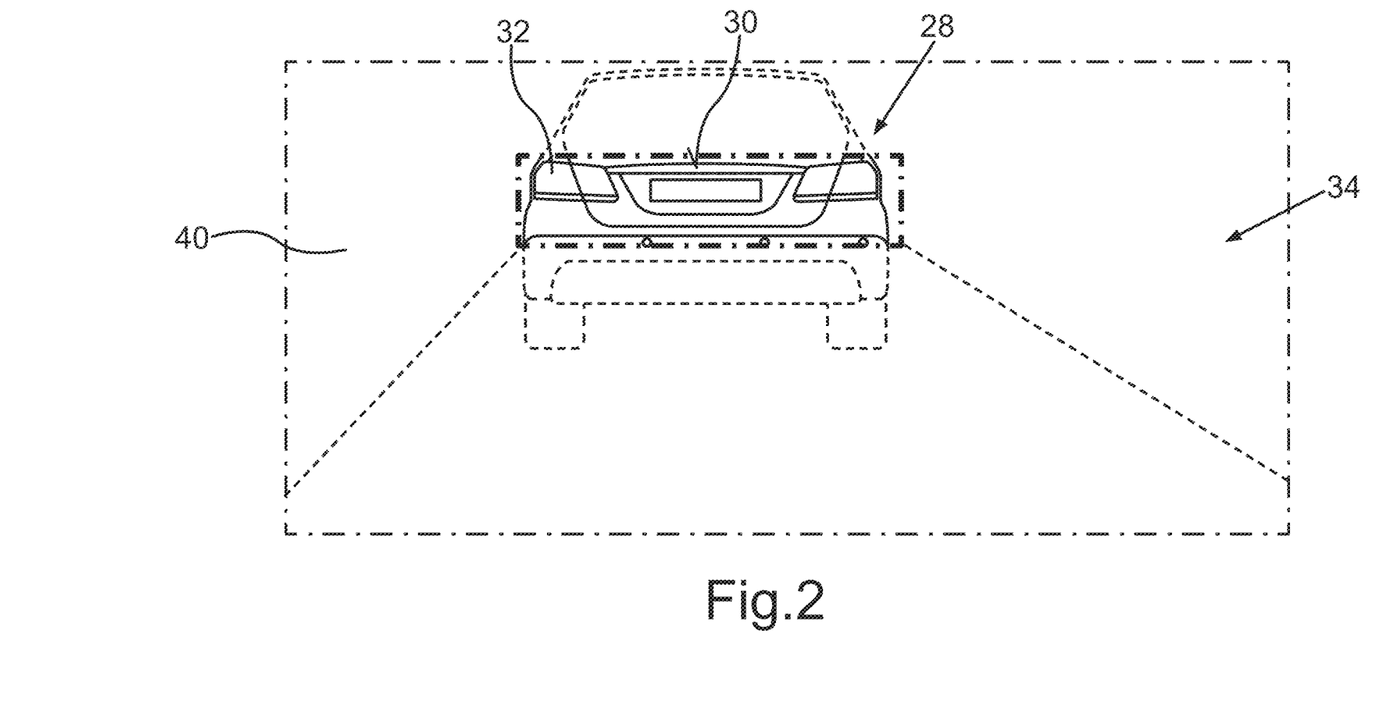
FIG. 2 schematically shows a field of vision of a driver of the motor vehicle during a journey in fog in the dark using the invention according to FIG. 1.

Depending on the detected object position data, the evaluation unit 18 determines a region 30 in which the object 32 is located, and region data corresponding to the region 30. The region data likewise comprise spatial position data specifying a position and an extent of the region, however. The region 30 in this case is formed by a rectangle comprising the object 32, which here is the two rear lights of the motor vehicle 28 driving in front and a license plate, arranged between the rear lights, of the motor vehicle 28 driving in front (FIG. 2). The region 30 is therefore formed by a solid angle which, at the position of the object 32, provides the rectangular shape that surrounds the object 32 or comprises the object 32.

The evaluation unit 18 is further designed to generate data for the light distribution 34 based on the region data in such a way that a light intensity in the region 30 is reduced in this case with respect to a reference light intensity. The evaluation unit 18 accordingly determines the headlight signal 14 therefrom which is output at the headlight terminal 16 for the pixel headlight 12. The pixel headlight 12 receives the headlight signal 14 and adjusts the laser scanner 38 thereof in such a way that the predefined light distribution 34 having the region 30 with reduced light intensity is produced.

Because the light intensity is reduced in the region 30, less scattered light is produced by the fog 40, as a result of which the rear lights 32, which are self-illuminated, can be better perceived by the driver of the motor vehicle, in this case the motor vehicle driving behind. The invention thus produces an increase in contrast.

In this case, the region 30 is determined based on a geometric shape of a rectangle. The region 30 is thus determined in the manner of a solid angle in which the pixel headlight 12 merely emits reduced light. The result of this inventive principle is shown in FIG. 2, which reproduces a view from the perspective of the driver of the motor vehicle in darkness and fog 40.

It can be seen that the pixel headlight 12 is controlled in such a way that reduced light emission takes place in the region 30. As a result, it can be achieved that the rear lights 32 of the motor vehicle 28 driving in front, as well as the license plate thereof, can be easily perceived despite the fog 40. Although the motor vehicle 28 driving in front can otherwise barely be perceived, the rear lights 32 can be reliably perceived. The invention thus achieves the aim of providing the light distribution 34.

By means of the invention, it is therefore achieved that regions of self-illuminating objects, such as self-illuminating signs, traffic lights and the like can be omitted in the light distribution 34 emitted by the pixel headlight 12. As a result, scattered light in the region 30 and thus glare therefrom is reduced and the contrast simultaneously increased. Objects 32 of this kind can therefore be better perceived at an earlier time by the driver of the motor vehicle.

Alternatively, it is also possible for the object 32 to be highlighted by lightly pulsing the light intensity provided in the region 30 by the pixel headlight 12.

Particularly preferably, the pixel headlight 12 is a headlight that has high resolution, i.e., an HD pixel headlight, for example. These are particularly suitable for use in the invention because they can project particularly detailed individual light distributions 34 onto the street and, in the process, can darken or brighten the self-illuminating objects within narrow limits.

Overall, the invention can achieve an improved contrast between self-illuminating objects and a background brightness in fog. Furthermore, better and earlier perceptibility of self-illuminating objects can be achieved.

Figure 3:
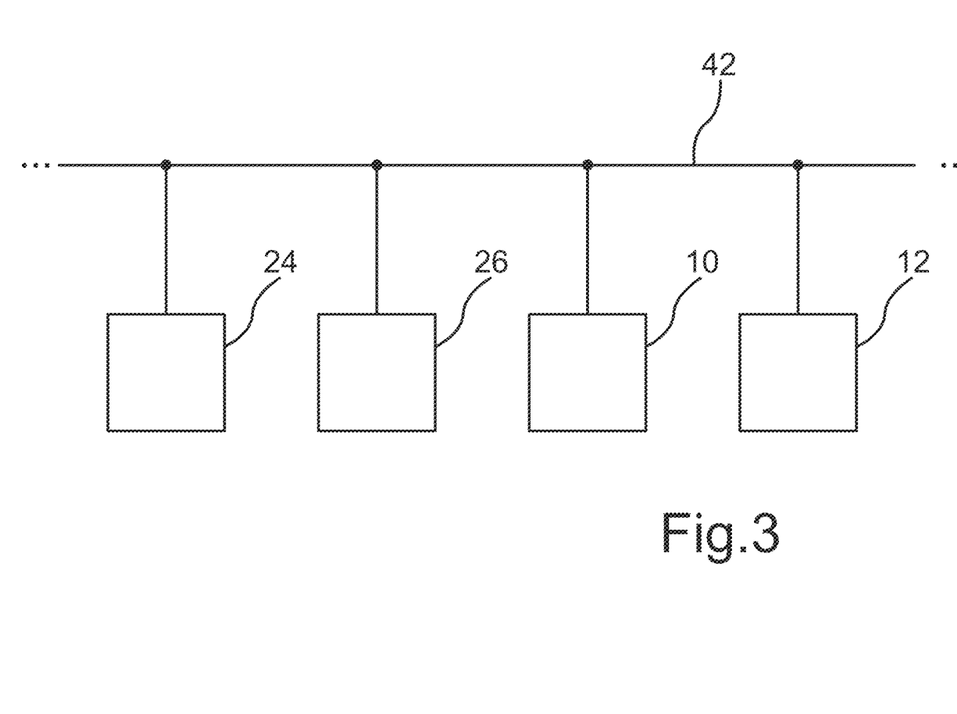
FIG. 3 schematically shows a CAN bus of the motor vehicle according to FIG. 2, to which the headlight, the control device, a camera and a radar sensor are connected.

FIG. 3 discloses, in a schematic block diagram, an alternative connection of the camera 24, the radar sensor 26, the control device 10 and the headlight 12 to a CAN bus 42 of the motor vehicle. A communication link between the aforementioned units can thus be provided by the CAN bus 42. No additional separate lines and terminals are therefore required.

The embodiment serves only to explain the invention and does not limit the invention. In particular, corresponding method features can be provided for apparatus features and vice versa.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A control device for a vehicle headlight that emits light according to a headlight signal that corresponds to an adjustable light distribution, the control device comprising:
   an output configured to output the headlight signal corresponding to the adjustable light distribution to the headlight; and
   an evaluation unit coupled to a detection unit,
   wherein the evaluation unit is configured to, when particles are detected by the detection unit and a self-illuminating object is detected, to determine object position data of the object and, on the basis of the object position data, to determine a region in which the object is located,
   wherein the evaluation unit is further configured to generate data for the adjustable light distribution based on the determined region in such a way that the adjustable light distribution produces a first light intensity in the determined region that is reduced with respect to a second light intensity surrounding the determined region produced by the adjustable light distribution and, from the data for the adjustable light distribution, to determine and output the headlight signal to produce the first light intensity in the determined region and the second light intensity surrounding the determined region so that the produced first light intensity in the determined region is reduced with respect to the produced second light intensity surrounding the determined region.

2. The control device of claim 1, wherein the control device is further configured to adjust the adjustable light distribution using a feedback control system, in which the detected self-illuminating object is illuminated by a locally variable illumination intensity and the feedback control system uses, as a controlled variable, a contrast between an actively illuminated zone of the detected self-illuminating object and a passively illuminated zone of the detected self-illuminating object.

3. The control device of claim 1, wherein the detection unit has a camera.

4. The control device of claim 1, wherein the detection unit has a radar.

5. A system for controlling a vehicle headlight that emits light according to a headlight signal that corresponds to an adjustable light distribution, the system comprising:
   an output configured to output the headlight signal corresponding to the adjustable light distribution to the headlight;
   a detection unit; and
   an evaluation unit coupled to the detection unit,
   wherein the evaluation unit is configured to, when particles are detected by the detection unit and a self-illuminating object is detected, to determine object position data of the object and, on the basis of the object position data, to determine a region in which the object is located,
   wherein the evaluation unit is further configured to generate data for the adjustable light distribution based on the determined region in such a way that the adjustable light distribution produces a first light intensity in the determined region that is reduced with respect to a second light intensity surrounding the determined region produced by the adjustable light distribution and, from the data for the adjustable light distribution, to determine and output the headlight signal to produce the first light intensity in the determined region and the second light intensity surrounding the determined region so that the produced first light intensity in the determined region is reduced with respect to the produced second light intensity surrounding the determined region.

6. The system of claim 5, wherein the control device is further configured to adjust the adjustable light distribution using a feedback control system, in which the detected self-illuminating object is illuminated by a locally variable illumination intensity and the feedback control system uses, as a controlled variable, a contrast between an actively illuminated zone of the detected self-illuminating object and a passively illuminated zone of the detected self-illuminating object.

7. The system of claim 5, wherein the detection unit has a camera.

8. The system of claim 5, wherein the detection unit has a radar.

9. A method for operating a vehicle headlight emitting light in accordance with a headlight signal that corresponds to an adjustable light distribution, the method comprising:
   detecting, by a detection unit, particles and a self-illuminating object;
   determining, responsive to detection of particles and the self-illuminating object, object position data of the self-illuminating object and, on the basis of the object position data, a region in which the self-illuminating object is located;
   generating data for the adjustable light distribution based on the determined region in such a way that a first light intensity in the determined region produced by the adjustable light distribution is reduced with respect to a second light intensity surrounding the determined region produced by the adjustable light distribution; and
   determining, from the data for the adjustable light distribution, the headlight signal to produce the first light intensity in the determined region and the second light intensity surrounding the determined region so that the produced first light intensity in the determined region is reduced with respect to the produced second light intensity surrounding the determined region.

10. The method of claim 9, wherein the region is determined based on a predefined geometric shape.

11. The method of claim 9, wherein the self-illuminating object is rear lights of a motor vehicle driving in front of the vehicle headlights.

12. The control device of claim 1, wherein the self-illuminating object is rear lights of a motor vehicle driving in front of the vehicle headlights.

13. The method of claim 9, wherein the light intensity in the determined region is changed in a pulsing manner.

14. The system of claim 5, wherein the self-illuminating object is rear lights of a motor vehicle driving in front of the vehicle headlights.

* * * * *